United States Patent
Murray et al.

(10) Patent No.: US 8,406,761 B2
(45) Date of Patent: Mar. 26, 2013

(54) INITIALIZING AND PROVISIONING USER EQUIPMENT HAVING MULTI-NETWORK CONNECTIVITY

(75) Inventors: David B. Murray, Fanwood, NJ (US); David W. Buehler, Jr., Lafayette Hill, PA (US); Daniel J. Murphy, Scotch Plains, NJ (US); Lipsa S. Goswamy, Oakland, CA (US); Phillip A. Ritter, Danville, CA (US)

(73) Assignees: Cellco Partnership, Basking Ridge, NJ (US); Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 13/186,931

(22) Filed: Jul. 20, 2011

(65) Prior Publication Data

US 2013/0023236 A1 Jan. 24, 2013

(51) Int. Cl.
*H04W 36/36* (2009.01)
(52) U.S. Cl. ............... 455/435.2; 455/415; 455/435.1; 455/441; 370/338; 370/230

(58) Field of Classification Search .................. None
See application file for complete search history.

(56) References Cited

U.S. PATENT DOCUMENTS

| 2009/0305671 | A1* | 12/2009 | Luft et al. ............... 455/411 |
| 2010/0130185 | A1* | 5/2010 | Desai et al. ............ 455/415 |
| 2011/0177811 | A1* | 7/2011 | Heckman et al. ........ 455/435.1 |
| 2012/0071163 | A1* | 3/2012 | Klingenbrunn et al. ... 455/435.2 |

* cited by examiner

Primary Examiner — Marcos Batista
Assistant Examiner — Keith Fang

(57) ABSTRACT

A device includes a first type of cellular capability for connecting to a first cellular network and a second type of cellular capability for connecting to a second cellular network. The device terminates advertising of the first type of cellular capability after determining that the device is not initialized. The device also transmits a request to the second cellular network by using the second type of cellular capability; receives a name of a carrier, associated with the device, from a server and via the second cellular network; and initializes the device based on the name of the carrier.

18 Claims, 10 Drawing Sheets

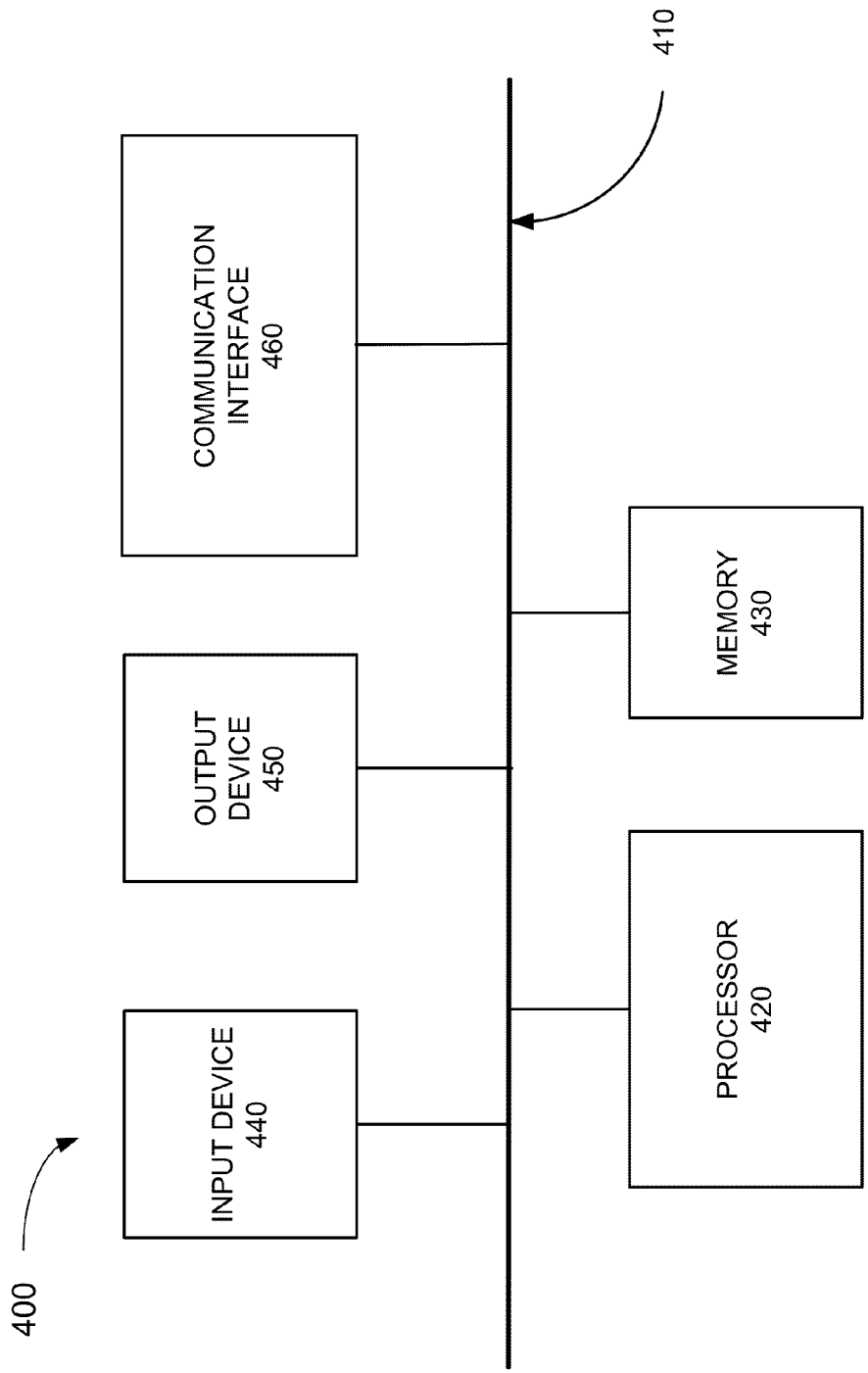

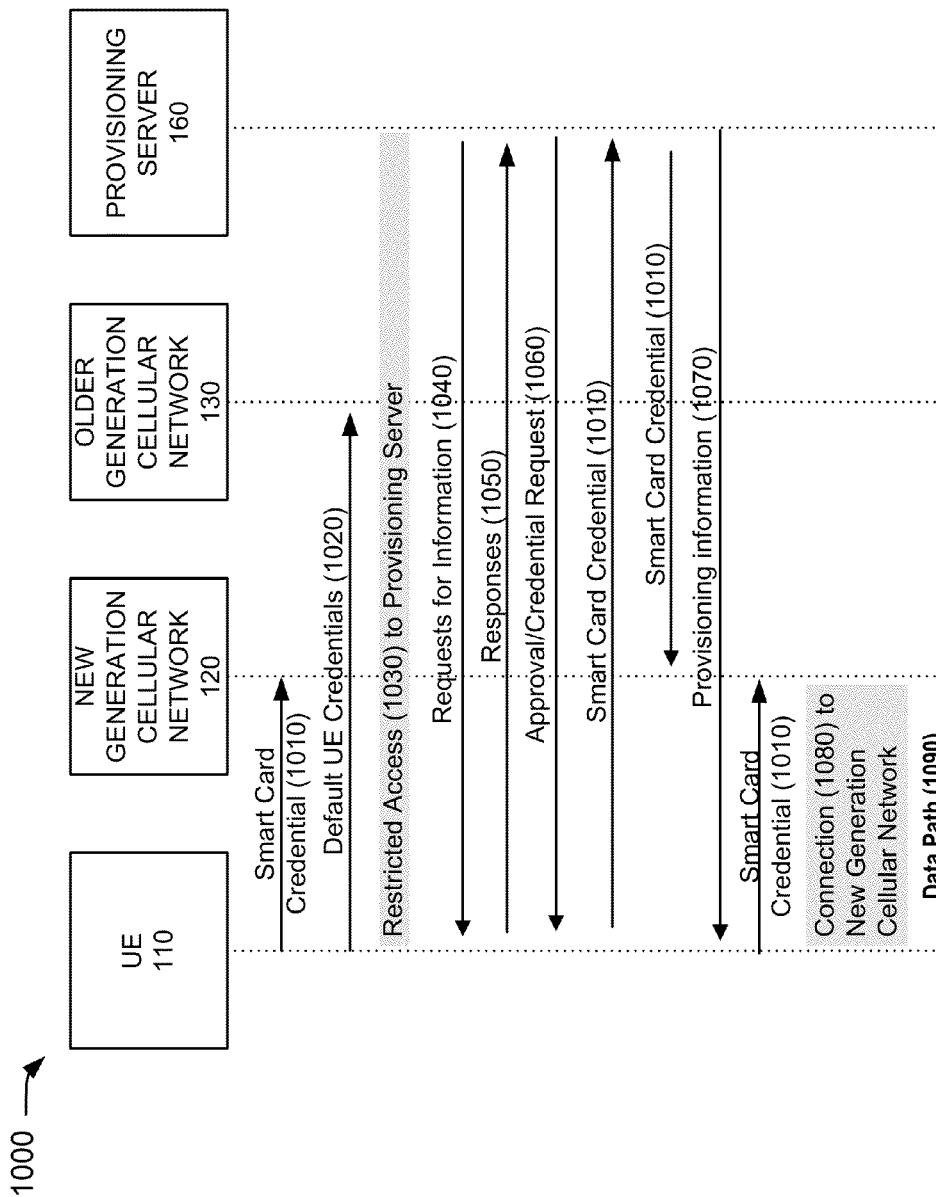

US 8,406,761 B2

INITIALIZING AND PROVISIONING USER EQUIPMENT HAVING MULTI-NETWORK CONNECTIVITY

BACKGROUND

Some original equipment manufacturers (OEMs) provide a user equipment (UE) (e.g., a mobile device) to retailers and/or consumers in an uninitialized state. When the UE is in an uninitialized state, the UE cannot connect to a cellular network because the UE does not have information necessary to connect to a particular cellular network of a carrier. The information needs to be downloaded to the UE for the device to be in the initialized state.

Currently, in order to download the information, one approach requires the UE to be physically connected, via a cable, to a computer with a high speed data connection. In order to use the first approach, the user of the UE has to locate the computer with the high speed data connection and the cable to connect the UE to the computer. Another approach is to wirelessly connect the UE to a high speed data connection via a wireless local area network (LAN) router. In order to use the second approach, the user of the UE has to locate an area that is within a particular range of the wireless LAN router and manually configure a wireless connection between the UE and the wireless LAN router.

Furthermore, some UEs include uninitialized smart cards (e.g., Universal Integrated Circuit Cards (UICCs)) that were not pre-provisioned in a cellular network. Accordingly, an uninitialized smart card of a UE cannot be used to connect the UE to a cellular network. An associate of a service provider has to manually provision the smart card in the cellular network before the smart card of the UE can be used to connect the UE to the cellular network

BRIEF DESCRIPTION OF THE DRAWINGS

FIG. 4 is a diagram of example components of one or more devices of FIG. 1;

FIG. 10 is a flow diagram of an example provisioning of the smart card.

DETAILED DESCRIPTION OF PREFERRED EMBODIMENTS

Figure 1:
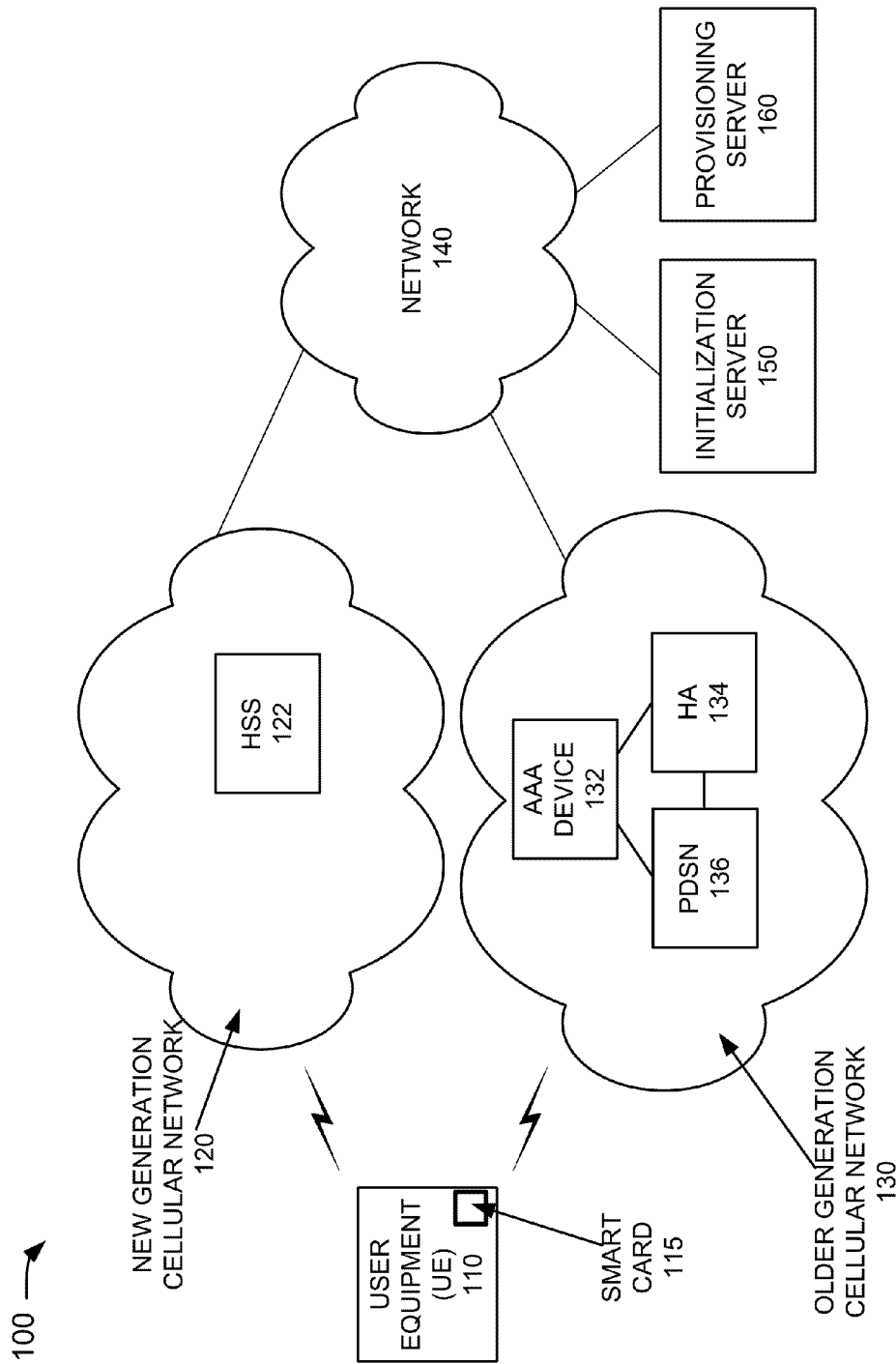
FIG. 1 is a diagram of an example environment in which systems and/or methods described herein may be implemented.

The following detailed description refers to the accompanying drawings. The same reference numbers in different drawings may identify the same or similar elements.

A carrier may refer to one or more of a mobile network operator (MNO), a mobile phone operator, a carrier service provider (CSP), a wireless service provider, a wireless carrier, a cellular company, and/or any other company that provides mobile phone service(s) to users (e.g., subscribers of the carrier) via a network. A cellular network may refer to a carrier network provided and operated by the carrier. A particular type of cellular capability may allow a UE that supports/includes the particular type of capability to connect to a particular type of cellular network. The UE may include a particular type of technology to support the particular type of capability An implementation, described herein, may allow a UE to be initialized and/or a smart card to be provisioned, in a new generation cellular network, by using an older generation cellular network. The UE may determine that the UE is unable to connect to the new generation cellular network because the UE is not initialized (e.g., the UE does not know a name of carrier associated with the UE). In response, the UE may terminate advertising that the UE is able to connect to the new generation cellular network and connect to the older generation cellular network. The older generation cellular network may provide, to the UE, restricted access to the initialization server. The initialization server may provide, to the UE, initialization information that is necessary to initialize the UE. Thereafter, the UE may again advertise that the UE supports a capability for connecting to the new generation cellular network, and may use its smart card (e.g., UICC card) to, again, attempt to connect via the new generation cellular network.

In another implementation, described herein, a UE may determine that the UE is unable to connect via a new generation cellular network because the UE includes an uninitialized smart card that has not been pre-provisioned in the new generation cellular network. For example, the smart card may not have proper credentials that are associated with an account recognized by the new generation cellular network. In response, the UE may terminate advertising that the UE is able to connect to the new generation cellular network, and may connect to the older generation cellular network. The older generation cellular network may provide restricted access for the UE to interact with a provisioning server. A user of the UE may use the UE to provide information (e.g., credit card information of the user) requested by the provisioning server. The provisioning server may provision the smart card, of the UE, in the new generation cellular network, and may provide provisioning information to the UE. The provisioning information may include information that indicates that the smart card is provisioned in the new generation cellular network. Thereafter, the UE may again advertise that the UE is able to connect to the new generation cellular network, and may use the new credentials of the smart card to connect to the new generation cellular network.

FIG. 1 is a diagram of an example environment 100 in which systems and/or methods described herein may be implemented. As shown in FIG. 1, environment 100 may include one or more of the following elements: a UE 110, including a smart card 115; a new generation cellular network 120, including a home subscriber server (HSS) 122; an older generation cellular network 130, including an authorization, authentication, accounting (AAA) device 132, a home agent (HA) 134, and a packet data serving node (PDSN) 136; a network 140; an initialization server 150; and a provisioning server 160. While FIG. 1 shows a particular number and arrangement of elements, environment 100 may include additional elements, fewer elements, different elements, or differently arranged elements than are illustrated in FIG. 1. Additionally or alternatively, one or more elements of environment 100 may perform the tasks described as being performed by one or more other elements of environment 100.

UE 110 may include any computation or communication device, such as a wireless mobile communication device that is capable of communicating via new generation cellular network 120 and/or via older generation cellular network 130. For example, UE 110 may include a mobile telephone device, a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smart phone, a laptop computer, a camera, a personal gaming system, and/or another type of mobile computation or communication device.

In one implementation, UE 110 may store/maintain an International Mobile Equipment Identification (IMEI) field. The IMEI field may include an IMEI associated with UE 110. The IMEI may uniquely identify UE 110 to environment 100 (e.g., to new generation cellular network 120). Additionally or alternatively, the IMEI field may store an IMEI and a software version associated with UE 110 (IMEI SV). In another implementation, UE 110 may store/maintain a Mobile Equipment ID (MEID) field. The MEID field may include an MEID associated with UE 110. The MEID may also uniquely identify UE 110 to environment 100.

Smart card 115 may include a universal integrated circuit card (UICC) or any other type of smart card that includes information that identifies a user (e.g., a subscriber, a customer, etc.), of UE 110, to elements of new generation cellular network 120. Smart card 115 may include subscriber identity modules (SIM), which may be used by the elements of new generation cellular network 120 to identify the user. The SIMs may include, for example, a universal SIM (USIM), an Internet Protocol (IP) Multimedia Subsystem (IMS) SIM (ISIM), and a code division multiple access (CDMA) SIM (CSIM). UE 110 may use information from the CSIM, the USIM, and/or the ISIM to provision smart card 115 and to allow UE 110 to connect via new generation cellular network 120. The user (or another entity) may remove smart card 115 from UE 110 and install smart card 115 in a new UE.

New generation cellular network 120 may include an advanced cellular network (e.g., a mobile phone network) that provides users (e.g., subscribers), of a first carrier, cellular phone service within a particular geographic area (e.g., the United States of America (USA)). UE 110 may need to include new generation cellular technologies that support new generation cellular capabilities for UE 110 to connect to new generation cellular network 120. New generation cellular network 120 may include, for example, a fourth generation (4G) Long Term Evolution (LTE) network and/or an Evolved High Rate Packet Data (eHRPD) network.

For example, when new generation cellular network 120 includes a 4G LTE network, new generation cellular network 120 may include a LTE access network, which includes an eNodeB, a serving gateway (SGW), and a packet data network gateway (PGW). The eNodeB may include a wireless transceiver and may include functionality necessary to establish a wireless connection between UE 110 and the LTE access network. The SGW may provide an access point to and from UE 110, and may handle forwarding of data packets for UE 110, and may act as a local anchor point during hand-over procedures between different eNodeBs. The PGW may function as a gateway to an IP network (e.g., network 140). UE 110, while connected to a single SGW, may be connected to multiple PGWs (e.g., one for each IP network with which UE 110 communicates). The PGW may assign an IP address to UE 110.

HSS 122 may include one or more devices that store information about subscribers of new generation cellular network 120. For example, HSS 122 may store information associated with an identifier stored in smart card 115 of a subscriber (e.g., a user of UE 110), services that the subscriber has requested or been assigned and settings associated with the services, and/or a current location of the subscriber.

Older generation cellular network 130 may include a cellular network that is less advanced than new generation cellular network 120. Older generation cellular network 130 may also provide users (e.g., subscribers) cellular phone service within a particular geographic area (e.g., the United States of America (USA)). UE 110 may need to include older generation cellular technologies that support older generation cellular capabilities for UE 110 to connect to older generation cellular network 130. Older generation cellular network 130 may include, for example, a third generation (3G) network or a High Rate Packet Data (HRPD) network.

For example, when new generation cellular network 120 includes an eHRPD network and older generation cellular network 130 includes a HRPD network, new generation cellular network 120 and older generation cellular network 130 may share one or more elements, including, for example, CDMA base stations (not shown in FIG. 1). UE 110 may access new generation cellular network 120 and/or older generation cellular network 130 via the CDMA base stations.

AAA device 132 may include one or more devices that perform authentication, authorization, and/or accounting. For example, AAA device 132 may verify a user's identity, authorize access to a particular access network and/or access to network 140, authorize access to a particular server (e.g., initialization server 150 or provisioning server 160), authorize a particular service, and/or track consumption of network resources for a particular user.

Home agent 134 may include a data transfer device (i.e., a network device), such as a gateway, a router, a switch, a firewall, a network interface card (NIC), a hub, a bridge, a proxy server, an optical add-drop multiplexer (OADM), or some other type of device that processes and/or transfers data. In one implementation, home agent 134 may function as a gateway to an IP network (e.g., network 140). In another implementation, home agent 134 may assign an IP address to UE 110. In yet another implementation, home agent 134 may maintain current location (e.g., IP address) information for UE 110.

PDSN 136 may include a device (e.g., of a CDMA mobile network) that acts as a connection point between older generation cellular network 130 and an IP network (e.g., network 140). For example, PDSN 136 may include a network device, such as a gateway, a router, a switch, a firewall, a NIC, a hub, a bridge, a proxy server, an OADM, or some other type of device that processes and/or transfers data. PDSN 136 may provide an access point to and from UE 110, may handle forwarding of data packets for UE 110, and/or may act as a local anchor point during handover procedures.

Network 140 may include a single network, multiple networks of a same type, or multiple networks of different types. For example, network 140 may include one or more of: a direct connection between devices, components, and/or networks, a local area network (LAN), a wide area network (WAN) (e.g., the Internet), a metropolitan area network (MAN), an optical network, a cable television network, a satellite television network, a wireless network (e.g., a CDMA network, a general packet radio service (GPRS) network, and/or a LTE network), an ad hoc network, a telephone network (e.g., the Public Switched Telephone Network (PSTN) or a cellular network), a subset of the Internet, or a combination of networks. In one implementation, network 140 may include a portion, or all, of new generation cellular network 120 and/or older generation cellular network 130. In another implementation, network 140 may also allow the delivery of IP broadband services to UE 110, and may interface with other external networks.

Initialization server 150 may include one or more devices that perform initialization services. For example, initialization server 150 may receive a unique identifier of UE 110 via a restricted access provided by older generation cellular network 130. Initialization server 150 may determine a name of carrier associated with UE 110 based on the unique identifier. Initialization server 150 may transmit, to UE 110, the name of the carrier and/or any other information necessary for UE 110 to initialize via the restricted access provided by older generation cellular network 130. UE 110 may be initialized based on the name of the carrier and/or the other information provided by initialization server 150.

Provisioning server 160 may include one or more devices that perform provisioning services. For example, provisioning server 160 may receive a smart card credential of smart card 115, from UE 110, via a restricted access provided by older generation cellular network 130. Provisioning server 160 may request older generation cellular network 130 and/or new generation cellular network 120 to create an account associated with smart card 115 and to store information associated with smart card 115 and/or a user of UE 110 (e.g., in HSS 122).

Figure 2:
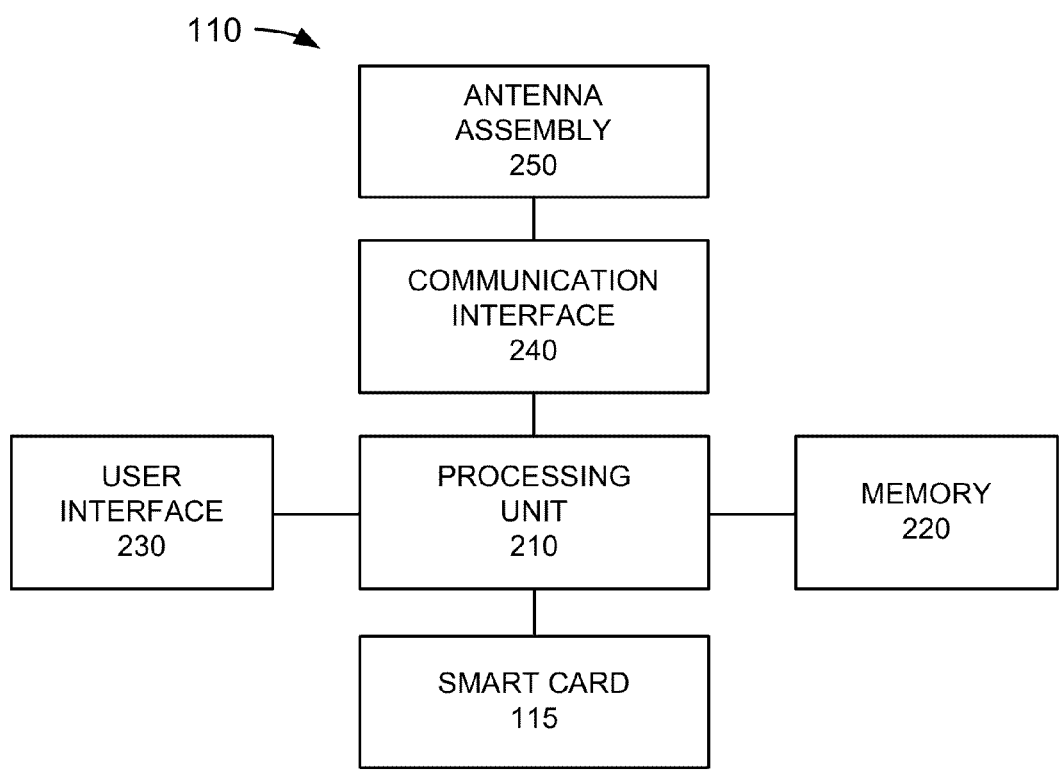
FIG. 2 is a diagram of example components of a user equipment (UE) of FIG. 1;
according to an implementation described herein.

FIG. 2 is a diagram of example components of UE 110. As shown in FIG. 2, UE 110 may include a processing unit 210, a memory 220, a user interface 230, a communication interface 240, an antenna assembly 250, and smart card 115.

Processing unit 210 may include one or more processors, microprocessors, application specific integrated circuits (ASICs), field programmable gate arrays (FPGAs), or the like. Processing unit 210 may control operation of UE 110 and its components.

Memory 220 may include a random access memory (RAM), a read only memory (ROM), and/or another type of memory to store data and instructions that may be used by processing unit 210.

User interface 230 may include mechanisms for inputting information to UE 110 and/or for outputting information from UE 110. Examples of input and output mechanisms might include a speaker to receive electrical signals and output audio signals; a camera lens to receive image and/or video signals and output electrical signals; a microphone to receive audio signals and output electrical signals; buttons (e.g., control buttons and/or keys of a keypad) to permit data and control commands to be input into UE 110; a display to output visual information; a light emitting diode; a vibrator to cause UE 110 to vibrate; etc.

Communication interface 240 may include any transceiver-like mechanism that enables UE 110 to communicate with other devices and/or systems. For example, communication interface 240 may include a modem or an Ethernet interface to a LAN. Communication interface 240 may also include mechanisms for communicating via a network, such as a wireless network. For example, communication interface 240 may include a transmitter that may convert baseband signals from processing unit 210 to radio frequency (RF) signals and/or a receiver that may convert RF signals to baseband signals. Alternatively, communication interface 240 may include a transceiver to perform functions of both a transmitter and a receiver. Communication interface 240 may connect to antenna assembly 250 for transmission and/or reception of the RF signals.

Antenna assembly 250 may include one or more antennas to transmit and/or receive RF signals over the air. Antenna assembly 250 may, for example, receive RF signals from communication interface 240 and transmit them over the air and receive RF signals over the air and provide them to communication interface 240. In one implementation, for example, communication interface 240 may communicate with new generation cellular network 120, older generation cellular network 130, and/or with one or more other cellular networks.

As described below, UE 110 may perform certain operations. UE 110 may perform these operations in response to processing unit 210 executing software instructions contained in a computer-readable medium, such as memory 220. A computer-readable medium may be defined as a non-transitory memory device. A memory device may include space within a single physical memory device or spread across multiple physical memory devices. The software instructions may be read into memory 220 from another computer-readable medium or from another device via communication interface 240. The software instructions contained in memory 220 may cause processing unit 210 to perform processes described herein. Alternatively, hardwired circuitry may be used in place of or in combination with software instructions to implement processes described herein. Thus, implementations described herein are not limited to any specific combination of hardware circuitry and software.

Processing unit 210 may communicate with smart card 115. For example, processing unit 210 may receive instructions from smart card 115 and may perform the received instructions. In one example, smart card 115 may instruct processing unit 210 to provide particular information to a particular element of environment 100 (e.g., new generation cellular network 120) via communication interface 240 and/or to request particular information from a particular element of environment 100. As another example, processing unit 210 may receive, via communication interface 240, particular information for smart card 115 from a particular element of environment 100 (e.g., provisioning server 160) and/or may receive a request for particular information about smart card 115 from a particular component of environment 100. As yet another example, when UE 110 powers up, smart card 115 may take control and may instruct processing unit 210 to perform one or more operations.

Although FIG. 2 shows example components of UE 110, in other implementations, UE 110 may include fewer components, different components, differently arranged components, or additional components than depicted in FIG. 2. Additionally or alternatively, one or more components of UE 110 may perform the tasks described as being performed by one or more other components of UE 110.

Figure 3A:
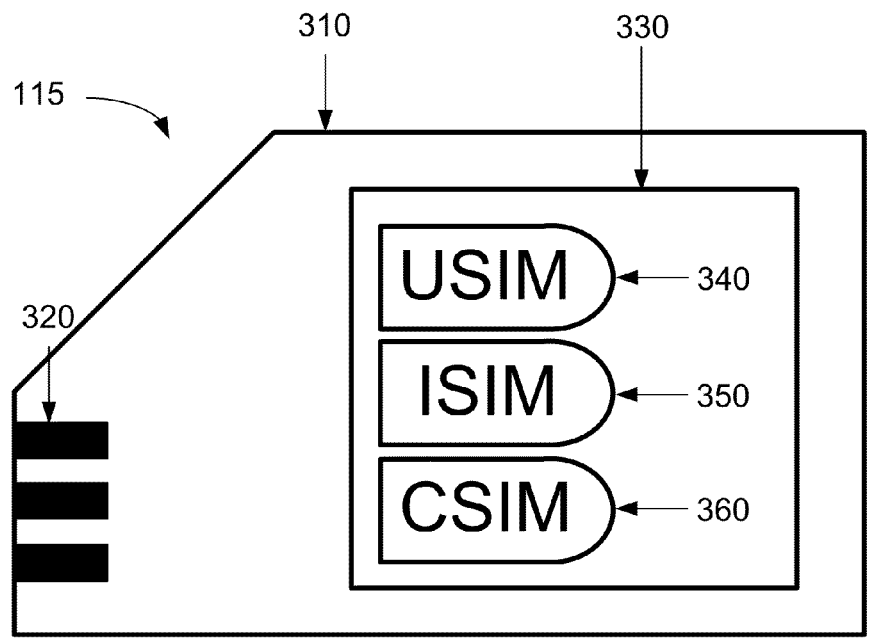
FIG. 3A is a diagram illustrating example components of an example smart card of FIGS. 1 and 2.

FIG. 3A is a diagram illustrating example components of smart card 115. As shown in FIG. 3A, smart card 115 may include a housing 310, contacts 320, and an integrated circuit (IC) area 330. Housing 310 may protect IC area 330 from outside elements. Housing 310 may include a structure configured to hold contacts 320 and IC area 330, and may be formed from a variety of materials. For example, housing 330 may be formed from plastic, metal, or a composite. Contacts 320 may include one or more contacts to electronically connect smart card 115 to UE 110. Contacts 320 may include a power contact to supply electrical power from UE 110 to smart card 115.

IC area 330 may include a Universal SIM (USIM) 340, an IMS SIM (ISIM) 350, and a CDMA SIM (CSIM) 360. USIM 340 may store subscriber information and authentication information for accessing new generation cellular network 120 and/or for accessing older generation cellular network 130. USIM 340 may also include storage space for SMS messages and contacts. ISIM 350 may store a subscriber's IMS identity, such as a public IMS identity and a private IMS identity. CSIM 360 may store subscriber information and authentication information for accessing new generation cellular network 120 and/or for accessing older generation cellular network 130.

Although FIG. 3A shows example components of smart card 115, in other implementations, smart card 115 may include fewer components, different components, differently arranged components, or additional components than depicted in FIG. 3A. Additionally or alternatively, one or more components of smart card 115 may perform the tasks described as being performed by one or more other components of smart card 115.

Figure 3B:
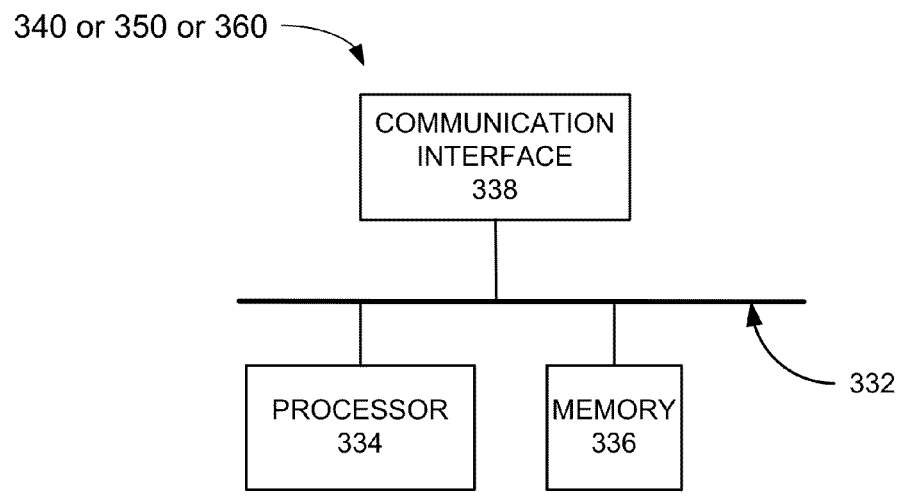
FIG. 3B is a diagram illustrating example components of a Universal SIM (USIM), an Internet Protocol Multimedia Subsystem SIM (ISIM), or a Code Division Multiple Access SIM (CDMA) of FIG. 3A.

FIG. 3B is a diagram illustrating example components of USIM 340, ISIM 350, or CSIM 360. As shown in FIG. 3B, USIM 340, ISIM 350, or CSIM 360 may include a bus 332, a processor 334, a memory 336, and a communication interface 338.

Bus 332 may include one or more connections that permit communication among the components of USIM 340, ISIM 350, or CSIM 360. Processor 334 may include one or more processors, microprocessors, or processing logic (e.g., ASICs or FPGAs) that may interpret and execute instructions. Memory 336 may include a RAM device or another type of dynamic storage device that may store information and instructions for execution by processor 334 or a ROM device or another type of static storage device that may store static information and instructions for use by processor 334. Communication interface 338 may include any interface mechanism that enables, USIM 340, ISIM 350, or CSIM 360 to communicate with UE 100.

USIM 340, ISIM 350, or CSIM 360 may perform certain operations in response to processor 334 executing software instructions contained in a computer-readable medium, such as memory 336. The software instructions may be read into memory 336 from another computer-readable medium, or from another device via communication interface 338. The software instructions contained in memory 336 may cause processor 334 to perform processes that will be described later. Alternatively, hardwired circuitry may be used in place of or in combination with software instructions to implement processes described herein. Thus, implementations described herein are not limited to any specific combination of hardware circuitry and software.

Although FIG. 3B shows example components of USIM 340, ISIM 350, or CSIM 360, in other implementations, USIM 340, ISIM 350, or CSIM 360 may include fewer components, different components, differently arranged components, or additional components than depicted in FIG. 3B. Additionally or alternatively, one or more components of USIM 340, ISIM 350, or CSIM 360 may perform the tasks described as being performed by one or more other components of USIM 340, ISIM 350, or CSIM 360.

FIG. 4 is a diagram of example components of a device 400 that may correspond to one or more of HSS 122, AAA device 132, home agent 134, PDSN 136, initialization server 150, or provisioning server 160. Alternatively, each of HSS 122, AAA device 132, home agent 134, PDSN 136, initialization server 150, or provisioning server 160 may include one or more devices 400. As shown, device 400 may include a bus 410, a processor 420, a memory 430, an input device 440, an output device 450, and a communication interface 460.

Bus 410 may include one or more connections that permit communication among the components of device 400. Processor 420 may include one or more processors, microprocessors, or processing logic (e.g., ASICs or FPGAs) that may interpret and execute instructions. Memory 430 may include a RAM device or another type of dynamic storage device that may store information and instructions for execution by processor 420, a ROM device or another type of static storage device that may store static information and instructions for use by processor 420, a magnetic and/or optical recording memory device and its corresponding drive, and/or a removable form of memory, such as a flash memory.

Input device 440 may include a mechanism that permits an operator to input information to device 400, such as a keypad, a button, a pen, a touch screen, voice recognition and/or biometric mechanisms, etc. Output device 450 may include a mechanism that outputs information to the operator, such as a display, a speaker, etc. Communication interface 460 may include any transceiver-like mechanism that enables device 400 to communicate with other devices and/or systems. For example, communication interface 460 may include a modem, a network interface card, or a wireless interface card.

As described below, device 400 may perform certain operations. Device 400 may perform these operations in response to processor 420 executing software instructions contained in a computer-readable medium, such as memory 430. The software instructions may be read into memory 430 from another computer-readable medium or from another device via communication interface 460. The software instructions contained in memory 430 may cause processor 420 to perform processes described herein. Alternatively, hardwired circuitry may be used in place of or in combination with software instructions to implement processes described herein. Thus, implementations described herein are not limited to any specific combination of hardware circuitry and software.

Although FIG. 4 shows example components of device 400, in other implementations, device 400 may include fewer components, different components, differently arranged components, or additional components than depicted in FIG. 4. Alternatively, or additionally, one or more components of device 400 may perform one or more other tasks described as being performed by one or more other components of device 400.

Figure 5:
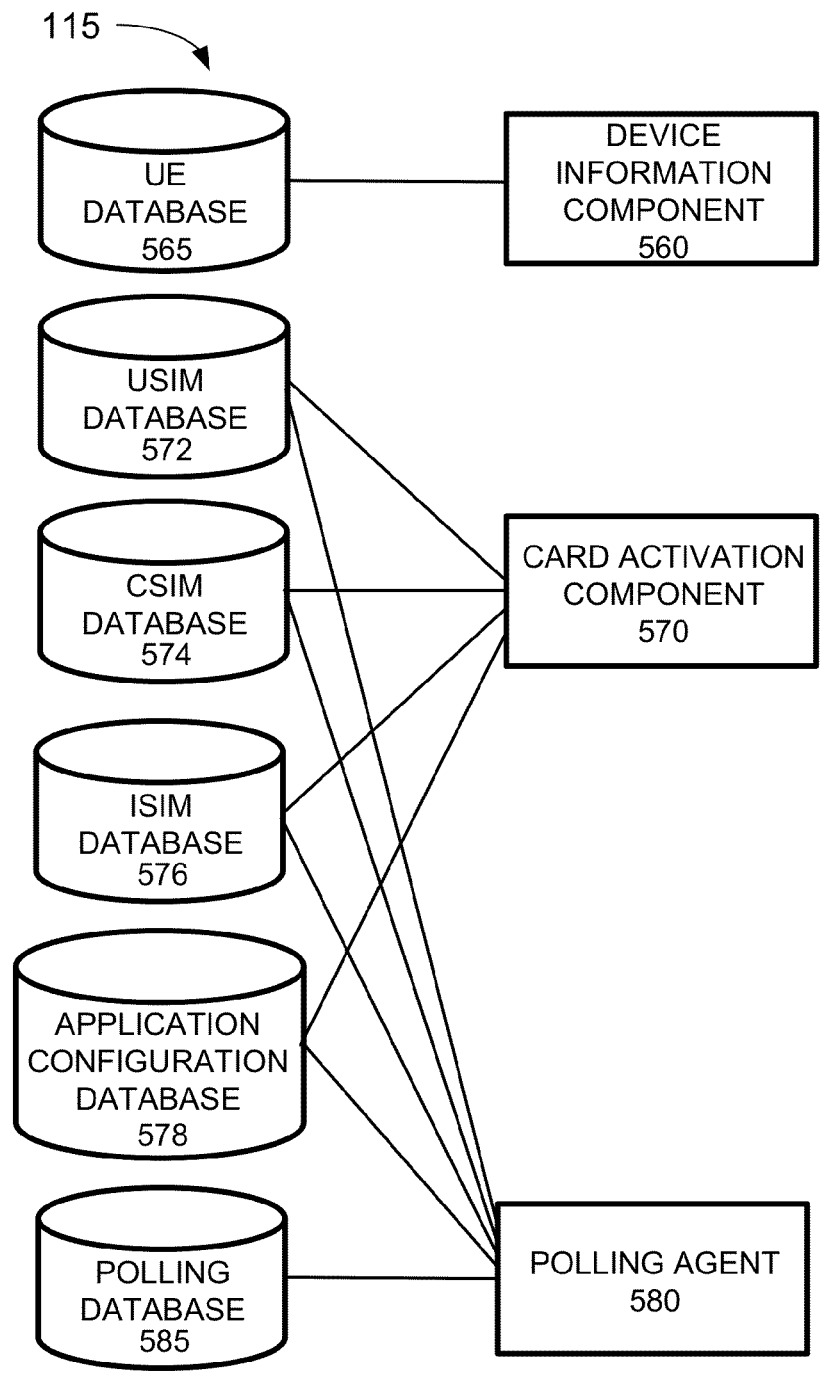
FIG. 5 is a diagram illustrating example functional components of a smart card.

FIG. 5 is a diagram illustrating example functional components of smart card 115. As shown in FIG. 5, smart card 115 may include a device information component 560, a UE database 565, a card activation component 570, a USIM database 572, a CSIM database 574, an ISIM database 576, an application configuration database 578, a polling agent 580, and a polling database 585.

Device information component 560 may determine information associated with UE 110 and store the information in UE database 565. UE database 565 may store information associated with UE 110. Example fields that may be stored in UE database 565 are described below with reference to FIG. 6. Card activation component 570 may receive file updates, and may store the file updates in USIM database 572, CSIM database 574, ISIM database 576, and application configuration database 578.

USIM database 572, CSIM database 574, and/or ISIM database 576 may store information used by smart card 115 during communication with new generation cellular network 120, older generation cellular network 130, and/or another type of network. Application configuration database 578 may store information about particular applications and/or settings associated with UE 110. Example fields that may be stored in USIM database 572, CSIM database 574, ISIM database 576, and application configuration database 578 are described below with reference to FIG. 6.

Polling agent 580 may detect, based on accessing polling database 585, a trigger event for requesting that smart card 115 be updated and may send a polling request for requesting updates. Polling agent 580 may receive file updates and may update USIM database 572, CSIM database 574, ISIM database 576, and application configuration database 578 based on the received file updates. Polling database 585 may store information about trigger events for requesting updates. For example, polling database 585 may store particular dates and times when polling agent 580 is to request an update.

Although FIG. 5 shows example functional components of smart card 115, in other implementations, smart card 115 may include fewer functional components, different functional components, differently arranged functional components, or additional functional components than depicted in FIG. 5. Additionally or alternatively, one or more functional components of smart card 115 may perform one or more other tasks described as being performed by one or more other functional components of smart card 115.

Figure 6:
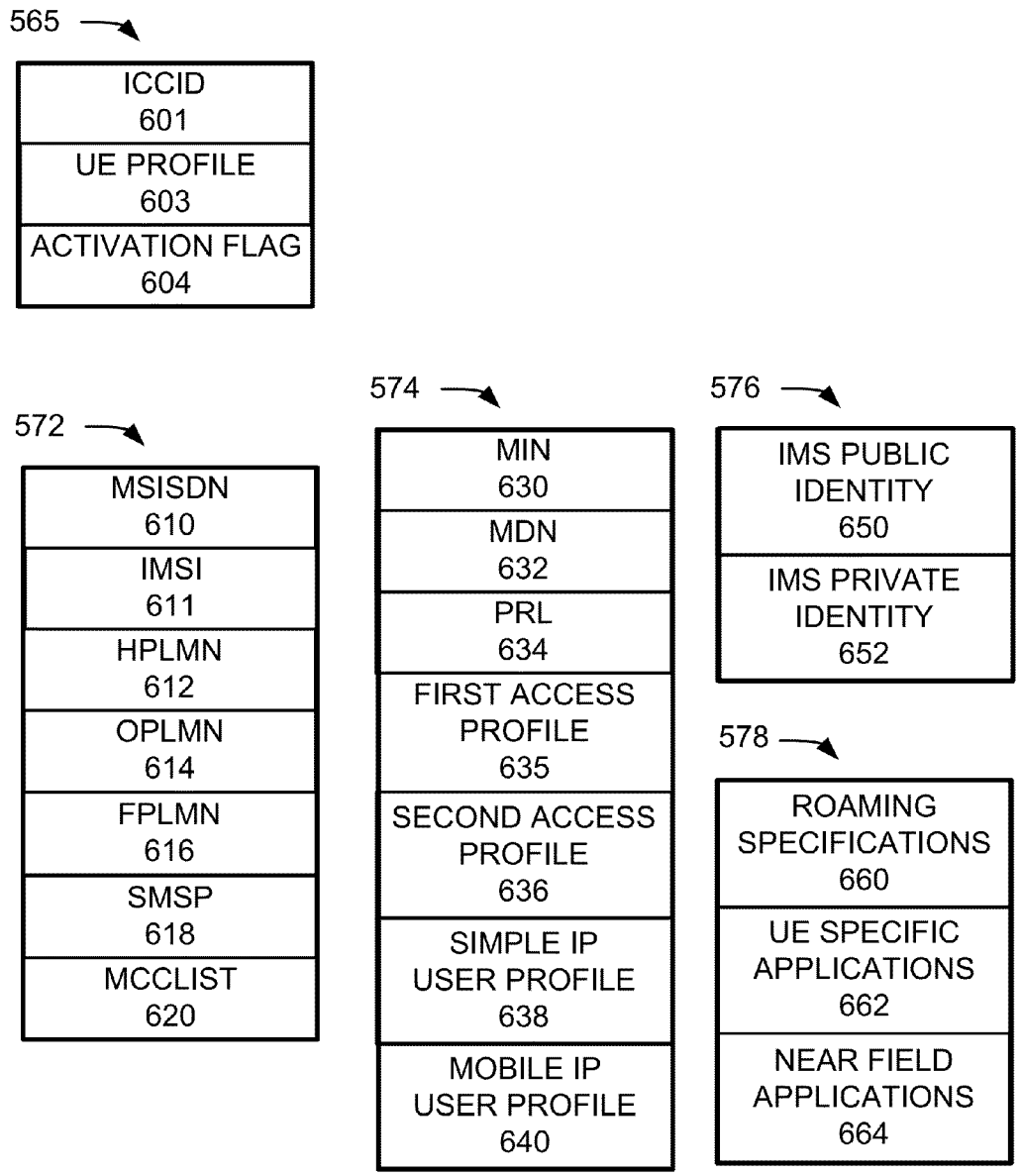
FIG. 6 is a diagram of example fields that may be stored within databases depicted in FIG. 5.

FIG. 6 is a diagram of example fields that may be included within the databases depicted in FIG. 5. As shown in FIG. 6, UE database 565 may include an Integrated Circuit Card Identification (ICCID) field 601, a UE profile 603, and an activation flag field 604. ICCID field 601 may store an ICCID associated with smart card 115. The ICCID may include a string that uniquely identifies smart card 115 to environment 100. UE profile 603 may store information associated with UE 110, such as capabilities of UE 110 and/or metrics associated with UE 110 that may be used by environment 100 to optimize the performance of UE 110. Activation flag field 604 may store information about whether smart card 115 has been activated. For example, after smart card 115 has been activated, an activation flag stored in activation flag field 604 may be set.

As further shown in FIG. 6, USIM database 572 may include a MSISDN field 610, an International Mobile Subscriber Identity (IMSI) field 611, a home public land mobile network (HPLMN) field 612, an operation PLMN (OPLMN) field 614, a forbidden PLMN (FPLMN) field 616, an SMS platform (SMSP) field 618, and a mobile country code list (MCCLIST) field 620.

MSISDN field 610 may store a MSISDN associated with the user of smart card 115. The MSISDN may uniquely identify a subscription to environment 100. IMSI field 611 may store an IMSI number associated with smart card 115. The IMSI number may uniquely identify a user to environment 100. The IMSI number may include a MCC that identifies a country associated with the user and a Mobile Network Code (MNC) associated with the user.

HPLMN field 612 may store a HPLMN (e.g., a service provider identification) associated with the user of smart card 115. OPLMN field 614 may store an OPLMN (e.g., a PLMN associated with administrative and monitoring functions) associated with the user of smart card 115. FPLMN field 616 may store a FPLMN (e.g., a PLMN accessible only during emergencies) associated with the user of smart card 115. SMSP field 618 may identify a SMS center. MCCLIST field 620 may identify a list of countries in which smart card 115 may operate.

As also shown in FIG. 6, CSIM database 574 may include a MIN field 630, a mobile directory number (MDN) field 632, a preferred roaming list (PRL) field 634, a first access profile field 635, a second access profile field 636, a simple IP user profile field 638, and a mobile IP user profile field 640.

MIN field 630 may store a MIN associated with UE 110 and may be derived from the MDN assigned to UE 110. MDN field 632 may store a MDN associated with a subscription in environment 100, associated with UE 110, and may correspond to an actual ten digit number dialed to reach UE 110. PRL field 634 may store a PRL associated with UE 110. The PRL may specify which bands, sub-bands, and/or service provider identifiers will be scanned and in what priority order. First access profile field 635 may store information used to access new generation cellular network 120 and/or older generation cellular network 130. Second access profile field 636 may store information used to access new generation cellular network 120, older generation cellular network 130, or another network. Simple IP user profile field 638 and mobile IP user profile field 640 may store settings for CDMA simple IP and mobile IP protocols, which may allow UE 110 to maintain IP connectivity while roaming.

ISIM database 576 may include an IMS public identity field 650, and an IMS private identity field 652. IMS public identity field 650 may include a user's public IMS identity. The public IMS identity may be used to communicate with other users in an IMS network. IMS private identity field 652 may store a user's private IMS identity. The private IMS identity may be assigned by a home network operator and may be used registration and AAA functions in an IMS network.

Application configuration database 578 may include a roaming specifications field 660, and a UE specific applications field 662. Roaming specifications field 660 may include roaming specifications associated with smart card 115. UE specific applications field 662 may include information associated with particular applications associated with UE 110.

Although FIG. 6 shows example fields of USIM database 572, CSIM database 574, ISIM database 576, and application configuration database 578, in other implementations, USIM database 572, CSIM database 574, ISIM database 576, and application configuration database 578 may contain fewer fields, different fields, additional fields, or differently arranged fields than depicted in FIG. 6. Additionally or alternatively, one or more fields of USIM database 572, CSIM database 574, ISIM database 576, and application configuration database 578 may include information described as being included in one or more other fields of USIM database 572, CSIM database 574, ISIM database 576, and application configuration database 578.

Figure 7:
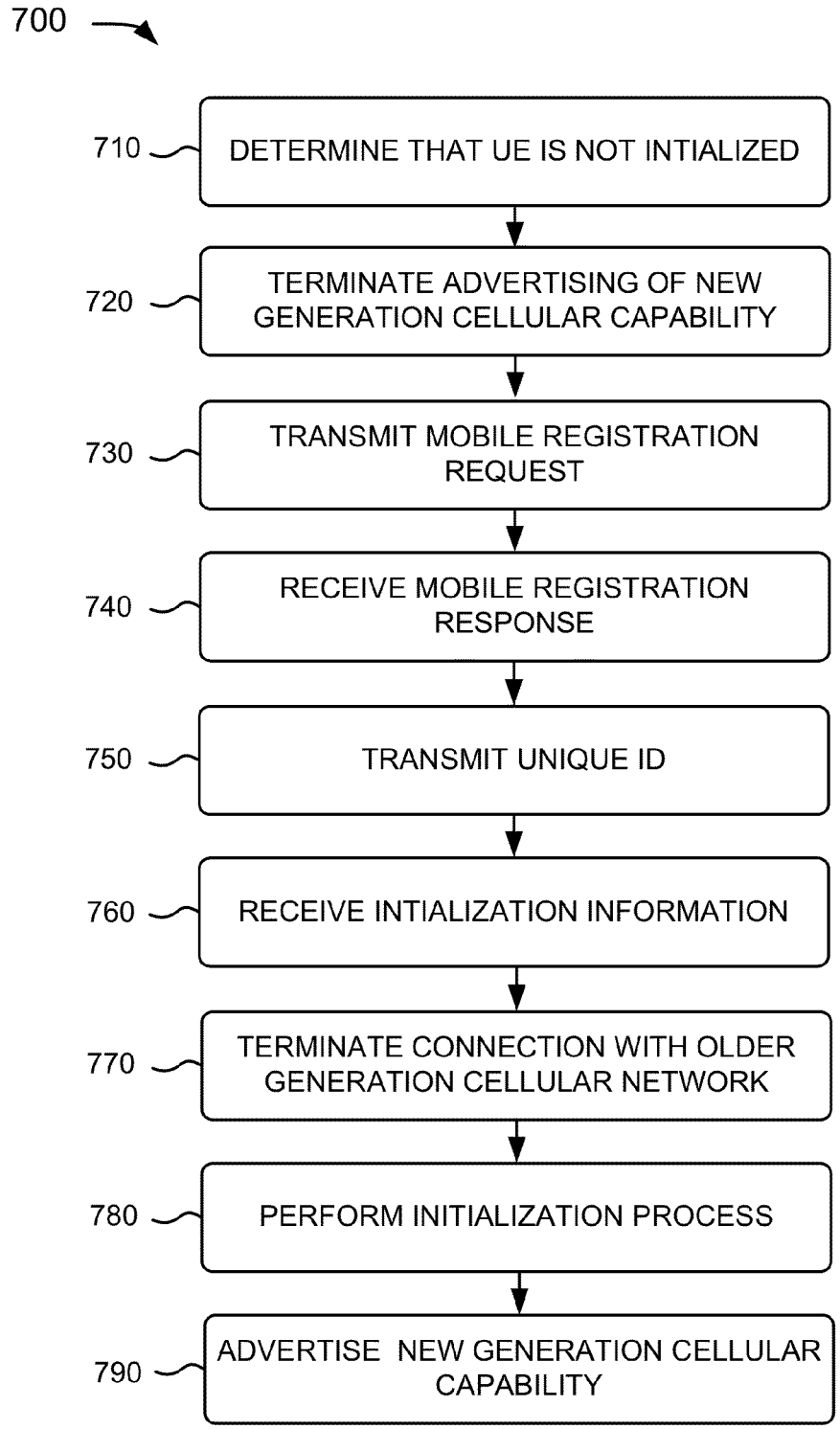
FIG. 7 is a flowchart of an example process for initializing a UE.

FIG. 7 is a flowchart of an example process 700 for initializing UE 110. In one example implementation, UE 110 may perform process 700. Alternatively, process 700 may be performed by one or more other devices, alone or in combination with UE 110. A portion of process 700 is described below in reference to FIG. 8.

As shown in FIG. 7, process 700 may include determining that UE 110 is not initialized (block 710). For example, a user may acquire UE 110 from (e.g., provided by) an original equipment manufacturers (OEM), and may power up UE 110. UE 110 may include a first type of cellular capability (e.g., eHRPD) to connect to a new generation cellular network and a second type of cellular capability (e.g., HRPD) to connect to an older generation cellular network. In one implementation, UE 110 may store information that indicates that UE 110 is not initialized. UE 110 may determine that UE 110 is not initialized based on the aforementioned information.

In another implementation, after UE 110 is powered-up, UE 110 may power-up a radio link and search for coverage. UE 110 may detect coverage provided by new generation cellular network 120, and may notify smart card 115 that new generation cellular network (e.g., eHRPD) coverage is available. UE 110 may retrieve a credential 810 (FIG. 8) from smart card 115. Credential 810 may include, for example, a (default) value stored in an IMSI field of smart card 115. UE 110 may transmit credential 810 to new generation cellular network 120 in order to connect to new generation cellular network 120. New generation cellular network 120 may reject the attempt by UE 110 to connect to new generation cellular network 120. In response to credential 810, new generation cellular network 120 may transmit a cause value 815 to UE 110. Cause value 815 may indicate that UE 110 cannot connect to new generation cellular network 120 by using credential 810 because new generation cellular network 120 has no record of (e.g., the IMSI value provided as) credential 810. Based on the response from new generation cellular network 120 (e.g., the cause value) and/or the failure to connect to new generation cellular network 120, UE 110 may determine that UE 110 is unable to connect to new generation cellular network 120 because UE 110 is not initialized.

Process 700 may further include terminating advertising of new generation cellular capability (block 720) and transmitting a mobile registration request (block 730). For example, after determining that UE 110 is not initialized (and is, therefore, unable to connect to new generation cellular network 120), UE 110 may terminate advertising the new generation cellular capability. Thereafter, UE 110 may continue to search for coverage, and may detect coverage provided by older generation cellular network 130. UE 110 may transmit a mobile registration request 820 (FIG. 8) to a PDSN of older generation cellular network 130. Mobile registration request 820 may include default credentials that are stored by UE 110. The default credentials may include, for example, values for an NAI and one or more (e.g., two) mobile IP authentication keys.

Figure 8:
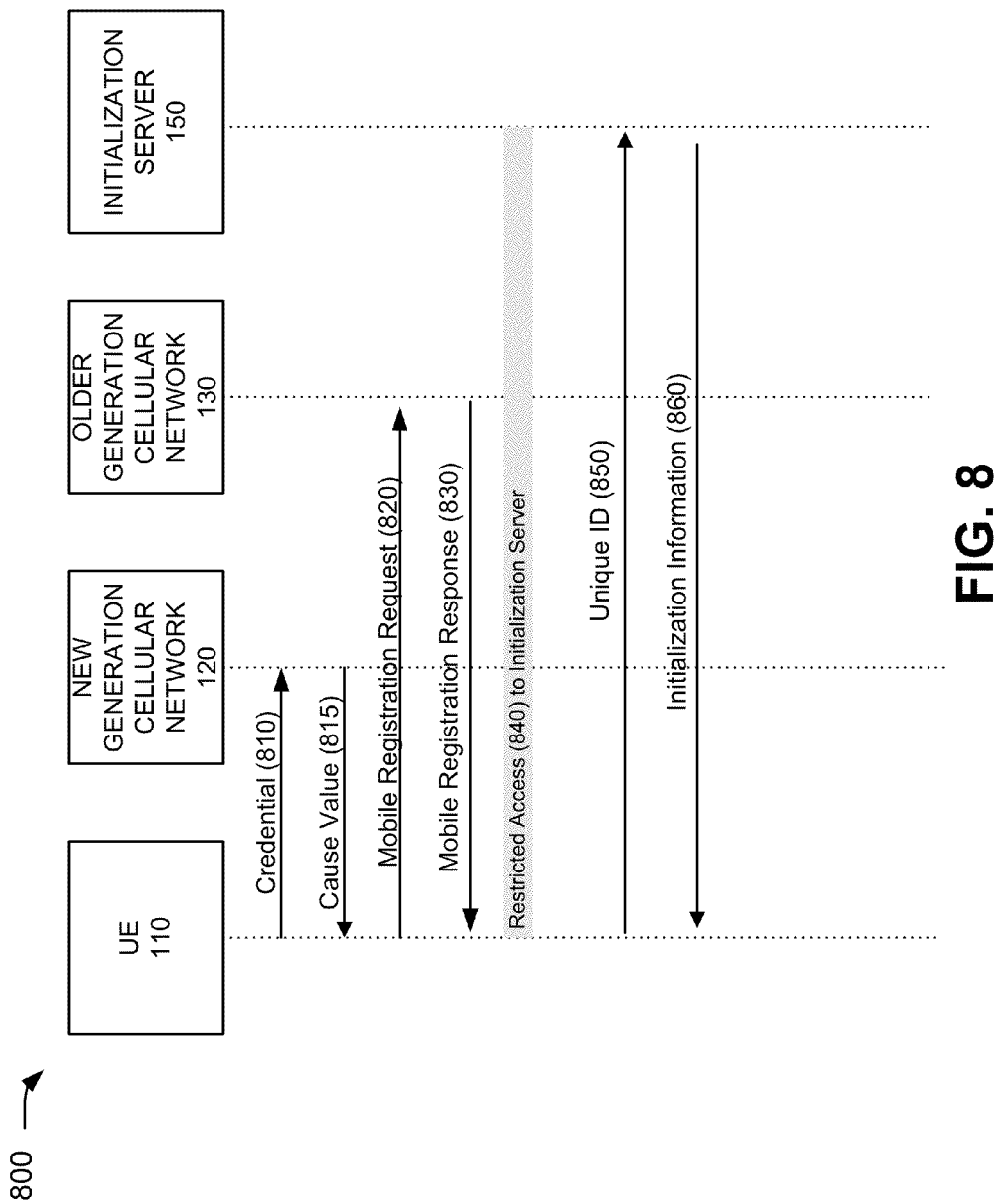
FIG. 8 is a flow diagram of an example initialization of the UE.

Process 700 may also include receiving a mobile registration response (block 740) and transmitting a unique identifier (ID) (block 750). For example, as shown in FIG. 8, the PDSN of older generation cellular network 130 may receive mobile registration request 820. The PDSN, an AAA, and/or an HA of older generation cellular network 130 may allow UE 110 to have a restricted access 840 (FIG. 8) to initialization server 150 via older generation cellular network 130. Restricted access 840 may prevent UE 110 from accessing any other servers and/or networks (e.g., the Internet) via older generation cellular network 130. In response to mobile registration request 820, older generation cellular network 130 may transmit a mobile registration response 830 (FIG. 8) to UE 110. UE 110 may receive mobile registration response 830. Mobile registration response 830 may include an error code. When the error code is equal to a particular value (e.g., 0), UE 110 may determine that restricted access 840 is granted from UE 110 to initialization server 150 via older generation cellular network 130. In response, UE 110 may transmit a unique ID 850 that identifies UE 110 to initialization server 150, via older generation cellular network 130. Unique ID 850 may include, for example, an IMEI and/or an MEID.

Process 700 may also include receiving initialization information (block 760). For example, initialization server 150 may receive unique ID 850. Initialization server 150 may identify a name of a carrier (e.g., a company that provides cellular phone service) and/or other information associated with UE 110 based on unique ID 850. Initialization server 150 may transmit the name of the carrier and/or the other information as initialization information 860 (FIG. 8) to UE 110. UE 110 may receive initialization information 860 via restricted access 840 provided by older generation cellular network 130.

Process 700 may also include terminating a connection with older generation cellular network 130 (block 770), performing an initialization process (block 780), and advertising the new generation cellular capability (block 790). For example, UE 110 may determine that UE 110 may be initialized based on initialization information 860. In response, UE 110 may terminate the connection to older generation cellular network 130 via which restricted access 840 is provided. Thereafter, UE 110 may perform an initialization process based on initialization information 860. The initialization process may include, for example, populating and/or updating different information stored by UE 110. For example, UE 110 may update the NAI parameter and populate a preferred roaming list based on the carrier identified in initialization information 860. After the initialization process is complete, UE 110 may again advertise its new generation cellular capability. As a result, UE 110 may again detect coverage provided by new generation cellular network 120, and may attempt to connect to new generation cellular network 120.

Figure 9:
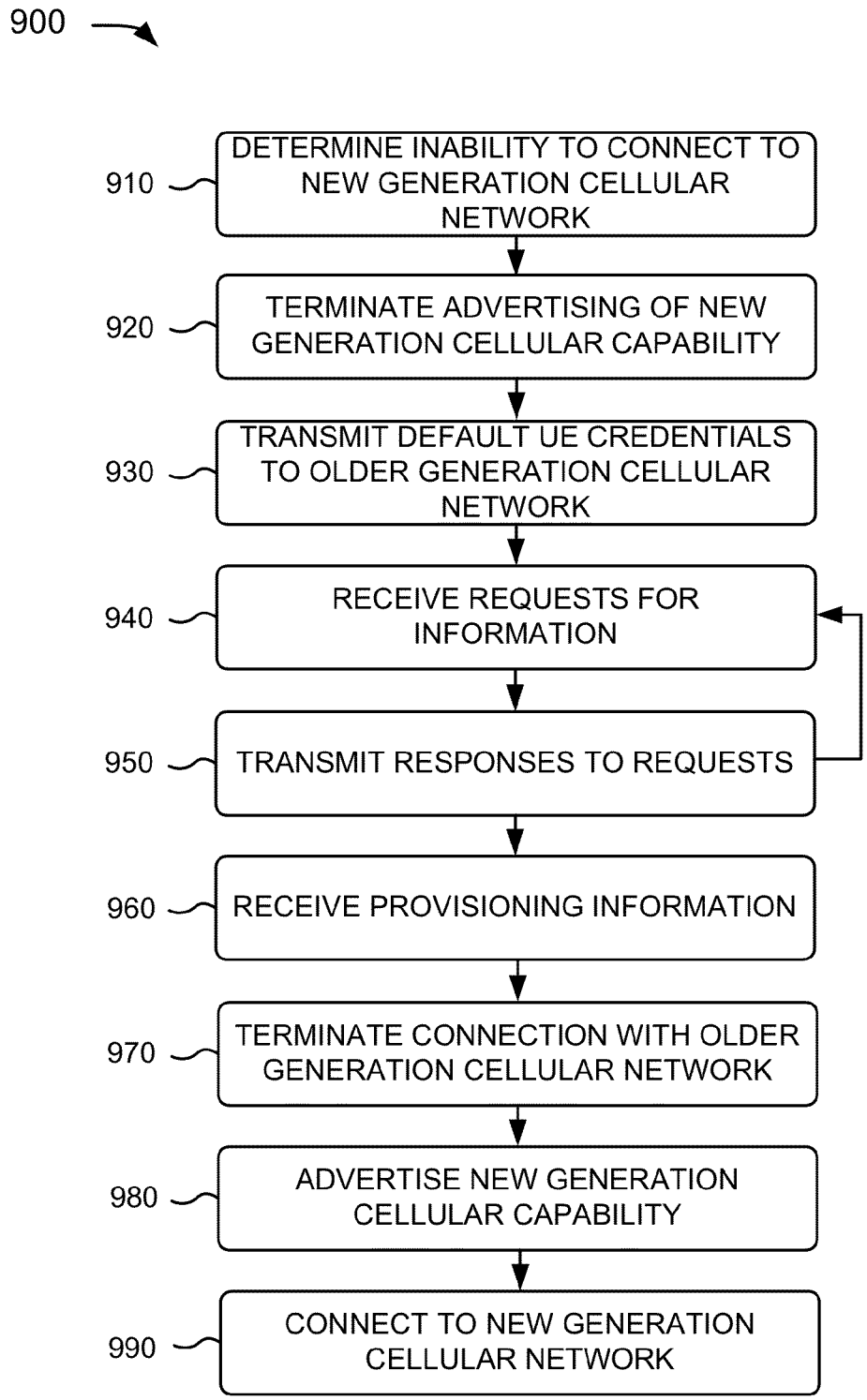
FIG. 9 is a flowchart of an example process for provisioning a smart card of a UE.

FIG. 9 is a flowchart of an example process 900 for provisioning smart card 115 of UE 110. In one example implementation, UE 110 may perform process 900. Alternatively, process 900 may be performed by one or more other devices, alone or in combination with UE 110. A portion of process 900 is described below in reference to FIG. 10.

As shown in FIG. 9, process 900 may include determining an inability to connect to new generation cellular network 120 (block 910). For example, a user may purchase UE 110 without a subscription to a cellular service plan provided by a carrier. Accordingly, UE 110 may include an uninitialized smart card 115 that was not pre-provisioned in new generation cellular network 120 before the purchase. After the user powers-up UE 110 and/or after an initialization of UE 110, UE 110 may attempt to connect to new generation cellular network 120 based on a smart card credential 1010 (FIG. 10) stored in smart card 115. Smart card credential 1010 may include credential 810 of FIG. 8. As described above in reference to block 710 of FIG. 7, new generation cellular network 120 may refuse the connection because new generation cellular network 120 is unable to authenticate smart card 115/UE 110 based on smart card credential 1010. Accordingly, UE 110 may determine that UE 110 is unable to connect to new generation cellular network 120 because smart card 115 is not provisioned in new generation cellular network 120.

Process 900 may further include terminating advertising of new generation cellular capability (block 920) and transmitting default UE credentials to older generation cellular network (block 930). For example, after determining that smart card 115 is not provisioned (and is, therefore, unable to connect to new generation cellular network 120), UE 110 may terminate advertising the new generation cellular capability. When doing so, UE 110 may ignore that UE 110 includes smart card 1010 that stores credential(s) (e.g., smart card credential 1010) for accessing cellular networks. Thereafter, UE 110 may continue to search for coverage, and may detect coverage provided by older generation cellular network 130. UE 110 may transmit default UE credentials 1020 (FIG. 10) to older generation cellular network 130. Default UE credentials 1020 may include values of credentials that are stored in UE 110, and not in smart card 115. Default UE credentials 1020 may include values in fields that are different from values of fields included in mobile registration request 820 of FIG. 8.

Process 900 may also include receiving requests for information (block 940) and transmitting responses to the requests (block 950). For example, older generation cellular network 130 may receive default UE credentials 1020. Older generation cellular network 130 may allow UE 110 to have a restricted access 1030 (FIG. 10) to provisioning server 160, via older generation cellular network 130, based on default UE credentials 1020. In response, provisioning server 160 may transmit requests for information 1040 (FIG. 10) to UE 110.

Requests for information 1040 may include questions about personal information associated with the user, questions regarding which type of cellular service plan the user wants to subscribe, and/or questions regarding how the user plans to pay for the cellular service. UE 110 may prompt the user to use UE 110 to enter responses 1050 (FIG. 10) in response to the questions included in requests for information 1040. Responses 1050 may include, for example, the personal information (e.g., demographic information, address, etc.) associated with the user, information identifying the type of cellular service plan the user wants to purchase (e.g., a pre-paid plan for one month, a pre-paid plan for 500 minutes, etc.), and payment information associated with how the user plans to pay (and/or be billed) for the cellular service (e.g., credit card information, account information of the user associated with a particular carrier, etc.).

UE 110 may transmit responses 1050 to provisioning server 160 via restricted access 1030 provided by older generation cellular network 130. UE 110 and provisioning server 160 may continuously exchange requests for information 1040 and responses 1050 until provisioning server 160 has sufficient information (e.g., included in responses 1050) to determine whether a particular carrier associated with UE 110 may provide a subscription for the cellular service plan to the user/UE 110.

Based on responses 1050, provisioning server 160 may determine that the user is eligible to sign-up for the cellular service plan requested by the user for UE 110. In one example, provisioning server 160 may check a credit history of the user based on the credit card information included in responses 1050 to determine whether the user is eligible. After determining that the user is eligible, provisioning server 160 may transmit an approval/credential request 1060 to UE 110 via restricted access 1030. Approval/credential request 1060 may indicate that the user is eligible for the cellular service plan and/or request UE 110 to provide a particular credential (e.g., smart card credential 1010) stored in smart card 115 of UE 110. In response to approval/credential request 1060, UE 110 may retrieve smart card credential 1010 from smart card 115, and transmit smart card credential 1010 to provisioning server 160.

Returning to FIG. 9, process 900 may also include receiving provisioning information (block 960). For example, provisioning server 160 may provision smart card 115 in new generation cellular network 120. In one example, provisioning server 160 may transmit a request for an HSS of new generation cellular network 120 to create an account associated with a value of smart card credential 1010 (e.g., an IMSI value). In another implementation, provisioning server 160 may also assign a phone number to smart card 115 that other mobile devices may use to provide data (e.g., voice data) to UE 110. Provisioning server 160 may generate provisioning information 1070. Provisioning information 1070 may indicate that smart card 115 is provisioned in new generation cellular network 120. Provisioning information 1070 may also include the assigned phone number and/or any other information necessary for UE 110 to connect to new generation cellular network 120 by using smart card 115. Provisioning server 160 may transmit provisioning information 1070 to UE 110. UE 110 may receive provisioning information 1070 via restricted access 1030 provided by older generation cellular network 130.

Process 900 may also include terminating a connection to older generation cellular network 130 (block 970), advertising the new generation cellular capability (block 980), and connecting to new generation cellular network 120 (block 990). For example, UE 110 may determine that smart card 115 of UE 110 is provisioned based on provisioning information 1070. In response, UE 110 may terminate the connection to older generation cellular network 130 via which restricted access 1030 is provided. Thereafter, UE 110 may again advertise its new generation cellular capability, and may detect coverage provided by new generation cellular network 120. To connect to new generation cellular network 120, UE 110 may transmit smart card credential 1010 to new generation cellular network 120. Based on smart card credential 1010, new generation cellular network 120 may authenticate smart card 115/UE 110 and allow UE 110 to connect to new generation cellular network 120. Accordingly, a connection 1080 (FIG. 10) may form to new generation cellular network 120 from UE 110. Thereafter, UE 110 may establish a data path 1090, via connection 180, with other UEs (e.g., by placing calls to other UEs or receiving calls from other UEs) and/or servers (e.g., by downloading data from/uploading data to the Internet).

The foregoing description of implementations provides illustration and description, but is not intended to be exhaustive or to limit the possible implementations to the precise form disclosed. Modifications and variations are possible in light of the above teachings or may be acquired from practice.

For example, while series of blocks have been described with regard to FIGS. 7 and 9, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the implementations. In fact, many of these features may be combined in ways not specifically recited in the claims and/or disclosed in the specification. Although each dependent claim listed below may directly depend on only one other claim, the disclosure of the implementations includes each dependent claim in combination with every other claim in the claim set. No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   detecting, by a device, coverage provided by a first cellular network that is available to the device, wherein the device comprises a first type of cellular capability for connecting to the first cellular network and a second type of cellular capability for connecting to a second cellular network;

terminating, by the device, advertisement of the first type of cellular capability responsive to determining that the device is not in an initialized state with respect to the first cellular network;

detecting, responsive to the terminating of the advertisement, coverage provided by the second cellular network that is available to the device;

transmitting, by the device via a restricted access connection provided by the second cellular network, a request to the second cellular network by using the second type of cellular capability;

receiving, responsive to the request, initialization information, associated with the device, from a server and via the restricted access connection provided by the second cellular network;

terminating, responsive to the receiving, the restricted access connection provided by the second cellular network;

initializing, responsive to the terminating the restricted access connection, the device with respect to the first cellular network based on the initialization information;

advertising, responsive to the initializing, the first type of cellular capability; and re-detecting, responsive to the advertising, coverage provided by the first cellular network that is available to the device.

2. The method of claim 1, wherein determining that the device is not in an initialized state comprises:

transmitting a credential, associated with a smart card of the device, to the first cellular network by using the first type of cellular capability, receiving a response from the first cellular network indicating that the first cellular network has no record of the credential, and determining that the device is not initialized based on the response.

3. The method of claim 2, wherein the credential comprises an International Mobile Subscriber Identity (IMSI) value stored in the smart card.

4. The method of claim 1, where the first cellular network is a Long Term Evolution (LTE) network or an Evolved High Rate Packet Data (eHRPD) network, and where the second cellular network is a third generation (3G) network or a High Rate Packet Data (HRPD) network.

5. The method of claim 1, further comprising:

transmitting a unique identifier, of the device, to the server, via the restricted access connection provided by the second cellular network, wherein the initialization information is associated with the unique identifier.

6. The method of claim 5, further comprising:

receiving a response, in response to the request, from the second cellular network;

determining whether the response is equal to a particular value; and determining that the restricted access connection is enabled when the response is equal to the particular value.

7. The method of claim 1, further comprising:

transmitting a credential, stored in a Universal Integrated Circuit Card (UICC) of the device, to the first cellular network responsive to re-detecting the first cellular network.

8. One or more non-transitory computer-readable media storing instructions executable by one or more processors of a device to perform a method, the method comprising:

detecting coverage provided by a first cellular network that is available to the device;

determining, responsive to the detecting, that the device is not in an initialized state with respect to the first cellular network;

terminating, responsive to the determining, advertisement of a capability of the device to connect to a first cellular network;

transmitting, responsive to the terminating, first credentials of the device to a second cellular network, wherein the second cellular network is an older generation of the first cellular network;

receiving, from a server and via the second cellular network, initialization information for the device corresponding to the first credentials;

initializing the device, with respect to the first cellular network, based on the initialization information;

advertising, responsive to the initializing, the capability of the device to connect to the first cellular network; and re-detecting, responsive to the advertising, coverage provided by the first cellular network that is available to the device.

9. The media of claim 8, wherein the method further comprises:

transmitting a credential of a smart card of the device to the first cellular network; and determining that the smart card is not provisioned in the first cellular network based on a failure to connect to the first cellular network.

10. The media of claim 9, where the method further comprises:

terminating the advertising of the capability of the device to connect to the first cellular network after determining that the smart card is not provisioned;

transmitting second credentials of the device to the second cellular network; and receiving provisioning information for the device, from a second server, via the second cellular network.

11. The media of claim 8, where the first cellular network is a Long Term Evolution (LTE) network or an Evolved High Rate Packet Data (eHRPD) network, and where the second cellular network is a third generation (3G) network or a High Rate Packet Data (HRPD) network.

12. The media of claim 8, where the first credentials comprise one or more of:

a network access identifier (NAI), or one or more mobile authentication keys.

13. The media of claim 8, where the method further comprises:

transmitting a unique identifier, of the device, to the server and via the second cellular network, before receiving the initialization information, and where the initialization information is associated with the unique identifier and comprises a name of a carrier associated with the device.

14. A device comprising:

a smart card; and a processor configured to:

detect coverage provided by a first cellular network that is available to the device, wherein the device comprises a first type of cellular capability for connecting to the first cellular network and a second type of cellular capability for connecting to a second cellular network;

terminate, based on a determination that the device is not in an initialized state with respect to the first cellular network, advertisement of the first type of cellular capability;

detect, responsive to the termination of the advertisement, coverage provided by the second cellular network that is available to the device;

transmit, responsive to the detection and using the second type of cellular capability, a request via a restricted access connection provided by the second cellular network;

receive, from a server in response to the request, initialization information associated with the device;

terminate, responsive to the initialization information, the restricted access connection provided by the second cellular network;

initialize, responsive to the termination of the restricted access connection, the device with respect to the first cellular network based on the initialization information;

re-advertise responsive to the initialization the first type of cellular capability; and re-detect, responsive to the re-advertisement, coverage provided by the first cellular network that is available to the device.

15. The device of claim 14, wherein when determining that the device is not in an initialized state, the processor is further configured to:

transmit a credential, associated with the smart card, to the first cellular network by using the first type of cellular capability, and receive, from the first cellular network, a response indicating that the device is not initialized.

16. The device of claim 15, wherein the response indicates that the first cellular network has no record of the credential, and wherein the credential comprises an International Mobile Subscriber Identity (IMSI) value stored in the smart card.

17. The device of claim 14, wherein the processor is further configured to:

transmit, to the server, a unique identifier of the device via the restricted access connection provided by the second cellular network, wherein the initialization information is associated with the unique identifier.

18. The device of claim 17, wherein the processor is further configured to:

receive, from the second cellular network, a response to the request;

determine whether the response is equal to a particular value; and determine that the restricted access connection is enabled when the response is equal to the particular value.

* * * * *

UNITED STATES PATENT AND TRADEMARK OFFICE
CERTIFICATE OF CORRECTION

PATENT NO. : 8,406,761 B2  
APPLICATION NO. : 13/186931  
DATED : March 26, 2013  
INVENTOR(S) : David B. Murray et al.

Page 1 of 1

It is certified that error appears in the above-identified patent and that said Letters Patent is hereby corrected as shown below:

Item [75] of the title page, should read as follows:

[75] Inventors: David B. Murray, Fanwood, NJ (US); Donald W. Buehler, Jr., Lafayette Hill, PA (US); Daniel J. Murphy, Scotch Plains, NJ (US); Lipsa S. Goswamy, Oakland, CA (US); Phillip A. Ritter, Danville, CA (US)

Signed and Sealed this  
Twenty-eighth Day of May, 2013

Teresa Stanek Rea  
*Acting Director of the United States Patent and Trademark Office*